Feb. 11, 1958 R. S. BRADSHAW ET AL 2,822,752
DIFFERENTIAL TYPE SETTING AND RESETTING MEANS
Filed March 4, 1955 5 Sheets-Sheet 1

INVENTORS
ROBERT S. BRADSHAW
DURAY E. STROMBACK
BY Leo Miller
ATTORNEY

Feb. 11, 1958   R. S. BRADSHAW ET AL   2,822,752
DIFFERENTIAL TYPE SETTING AND RESETTING MEANS
Filed March 4, 1955   5 Sheets-Sheet 2
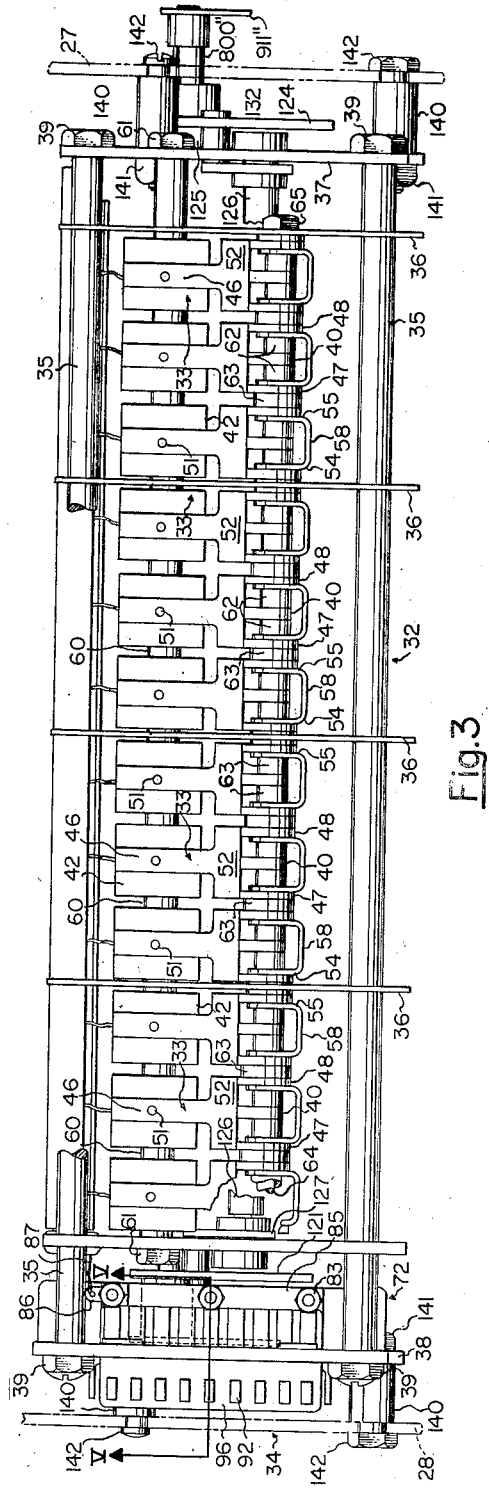
Fig.3
Fig.3a
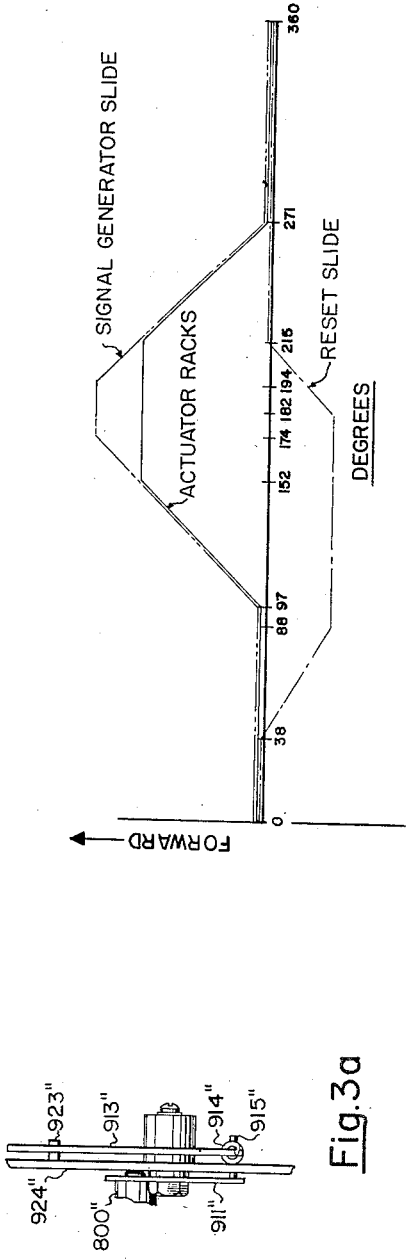
Fig.14
INVENTORS
ROBERT S. BRADSHAW
DURAY E. STROMBACK
BY
ATTORNEY Feb. 11, 1958  R. S. BRADSHAW ET AL  2,822,752
DIFFERENTIAL TYPE SETTING AND RESETTING MEANS
Filed March 4, 1955  5 Sheets-Sheet 3
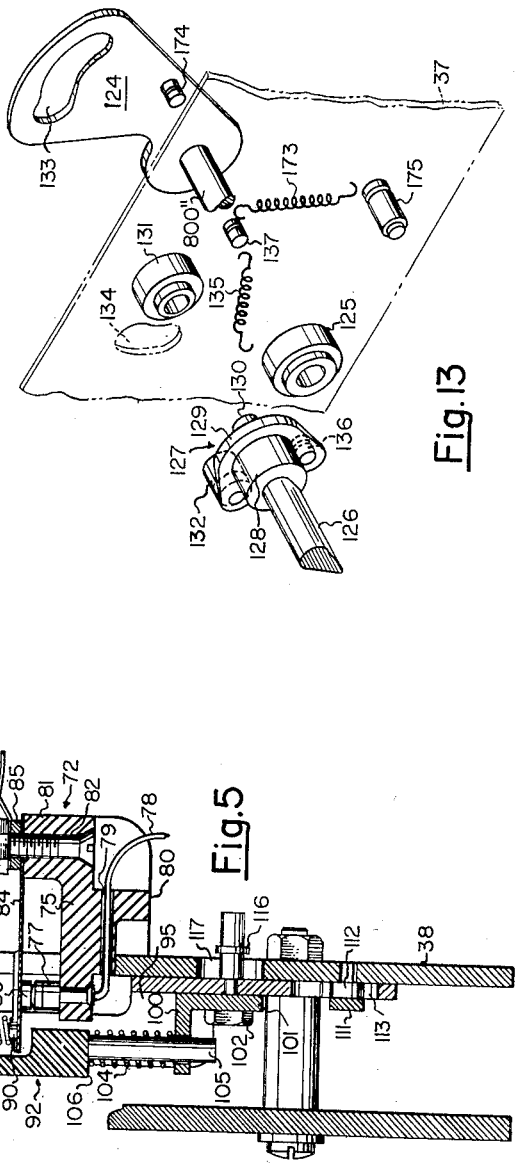
INVENTORS
ROBERT S. BRADSHAW
DURAY E. STROMBACK
BY
ATTORNEY

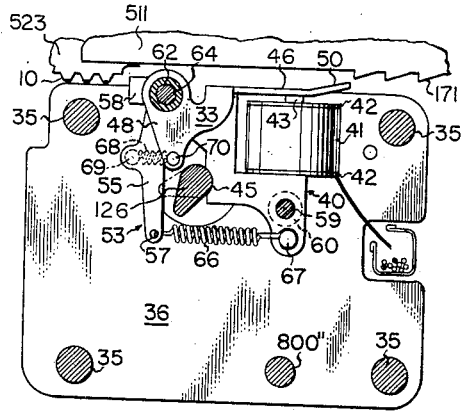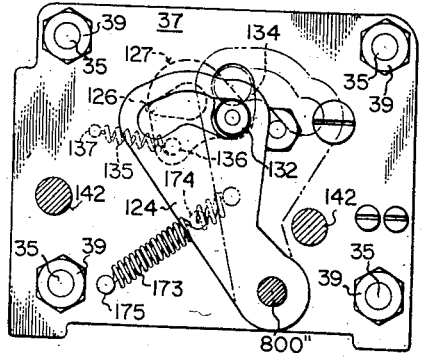

Feb. 11, 1958　　　R. S. BRADSHAW ET AL　　　2,822,752
DIFFERENTIAL TYPE SETTING AND RESETTING MEANS
Filed March 4, 1955　　　　　　　　　　　　　　5 Sheets-Sheet 5
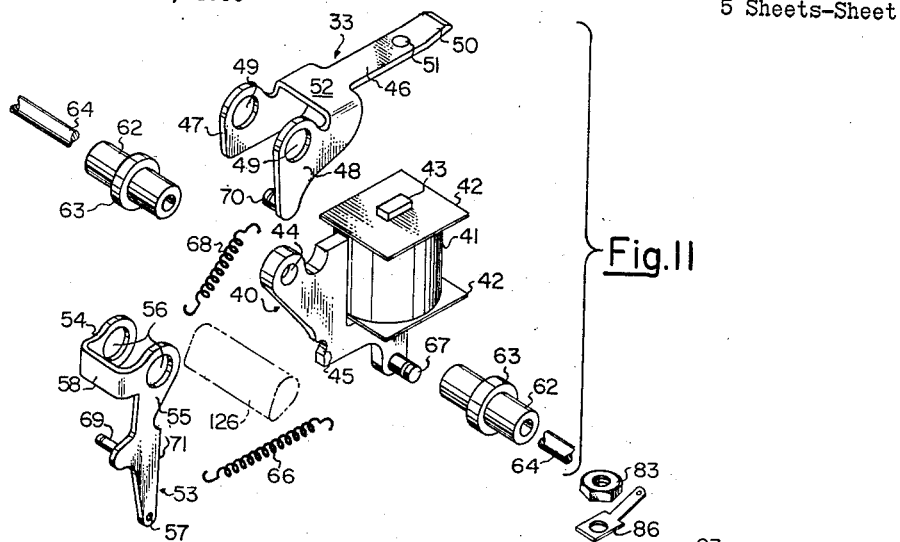
*INVENTORS*
ROBERT S. BRADSHAW
DURAY E. STROMBACK
BY
*Leo Miller*
ATTORNEY

United States Patent Office 2,822,752
Patented Feb. 11, 1958

2,822,752

DIFFERENTIAL TYPE SETTING AND RESETTING MEANS

Robert S. Bradshaw, Broomall, and Du Ray E. Stromback, Paoli, Pa., assignors to Burroughs Corporation, Detroit, Mich., a corporation of Michigan Application March 4, 1955, Serial No. 492,186

19 Claims. (Cl. 101—93)

This invention relates to a printing or indicating apparatus, and more particularly to an apparatus of the above mentioned class wherein electrical signals are utilized in determining mechanical positions.

In the computing or calculating field, it has been found to be advantageous in certain applications to physically separate the calculating or computing portion of the system from the printer or indicator. This separation permits the positioning of each portion at that location which will lead to the most efficient or convenient operation of the system. Further, and because the instant printing apparatus utilizes electrical signals in determining mechanical positions, it is possible to employ the apparatus in direct conjunction with an electronic computer without any need for intermediate conversionary apparatus. In addition, and through the utilization of conventional switching means, a single printer of the type disclosed herein can, if desired, be operated selectively and simultaneously or sequentially in conjunction with a multiplicity of computers or calculators. Conversely, it is equally feasible to operate a plurality of printers sequentially or simultaneously in a predetermined manner in conjunction with a single computer or calculator.

Accordingly, it is the primary object of the instant invention to provide a printing apparatus which utilizes electrical signals to determine mechanical positions.

An addtional object of the invention is to provide a printing system which may be remotely actuated by a computer or calculator.

For a greater appreciation of these and other objects of the invention reference is made to the following specification and accompanying drawings wherein.

Figure 1:
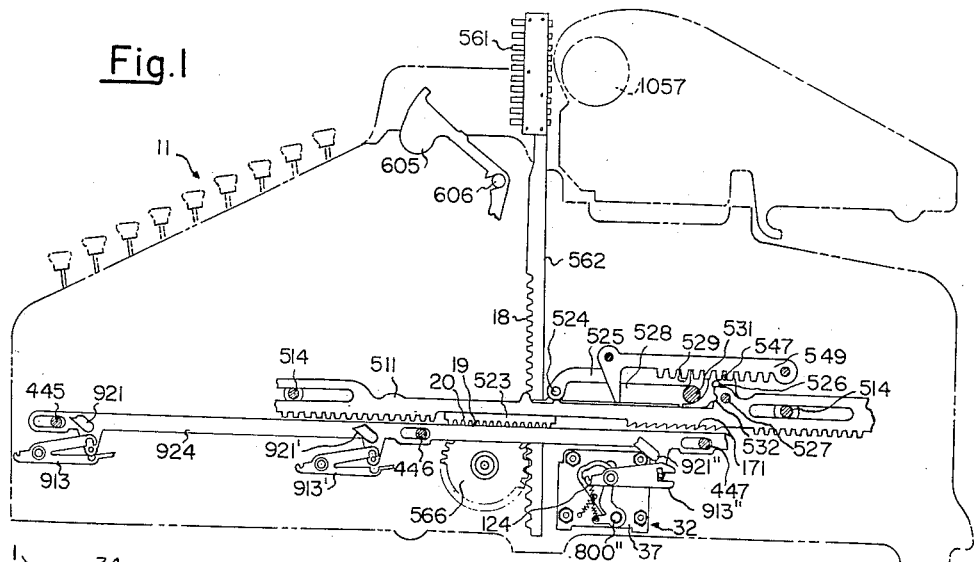
Fig. 1 is a fragmentary diagrammatic view of a printing apparatus constructed in accordance with the instant invention.

Figs. 3 and 3a taken together are a top plan view of the "read-in" portion of the printer; and, Fig. 4 is a front elevational view of the "read-in";

Fig. 5 is a view taken along line V—V of Fig. 3; and,

Figs. 6, 7, and 8 are views taken along lines VI—VI, VII—VII, and VIII—VIII respectively of Fig. 4;

Fig. 9 is a view taken along line IX—IX of Fig. 4 with the tappet assembly of Fig. 10 removed for purposes of clarity;

Fig. 10 is an elevational view of the tappet assembly portion of the signal generator illustrated in Figs. 5 and 9;

Fig. 11 is an exploded view of one of the clapper assemblies of the "read-in";

Fig. 12 is an exploded view of the signal generator; while,

Fig. 13 is an exploded view of the clapper resetting mechanism; and,

Fig. 14 is a timing diagram graphically representing a cycle of operation of the printer.

According to the present invention, a plurality of vertically movable print bars are provided, with each print bar carrying thereon along its upper portion a plurality of slugs of type corresponding to the numerals 0 through 9. The arrangement is such that vertical movement of any of the print bars will align one or another of its slugs of type with a plurality of hammers which when actuated will strike the slugs, causing the latter to make an impression upon a recording medium located in the path of the slugs.

A gear cluster is in mesh with the lower ends of the print bars and also with a plurality of horizontally movable actuator racks so that the horizontal reciprocation of any of the racks will result in the equivalent movement of a corresponding print bar. Accordingly, it is the magnitude of the horizontal movement of the actuator racks which determines the numerals to be printed, for it is this horizontal movement which causes the selective alignment of the slugs of type with the above mentioned hammers.

Below the actuator racks and extending transversely thereto is the "read-in" unit which comprises a signal generator and a plurality of solenoid controlled clappers, there being one clapper for each rack. A series of ten ratchet teeth adapted for selective engagement with its associated clapper is formed on the lower edge of each rack. A signal generator slide mechanically synchronized with the above mentioned actuator racks is designed to operate in conjunction with the signal generator for the purpose of indicating which ratchet teeth are immediately above the leading edges of the clappers at any given time. When the proper tooth of the desired rack or racks is over the clappers, the computer or calculator will, in a manner more fully described hereinafter, permit the clappers to rise and engage the ratchet teeth so as to stop the movement of the actuator racks. As each ratchet tooth space on the racks corresponds in distance to the pitch between the slugs of type on the print bars, the engagement of any specified tooth with a clapper will result in the alignment of a corresponding slug with its associated hammer.

In order to fully comprehend the significant features of the instant invention, it will be helpful to describe, to at least a limited extent, an environment in which it may be utilized. For a complete and detailed disclosure of an environment of this character, resort may be had to Patent No. 2,629,549 issued to T. M. Butler on February 24, 1953, for an Automatic Function Control Mechanism for Accounting Machines. In order to expedite cross-referencing, the reference numerals employed in the instant disclosure will, to t..e extent that it is practical, be identical to those designating similar elements in the above identified patent to Butler.

Referring now more particularly to the drawings, the numeral 11 generally designates a printer of the type described, having in the disclosed embodiment twelve print bars 562 and an equal number of actuator racks 511, all of which lie in planes parallel to that of the drawing. The actuator racks are forwardly and rearwardly slidably supported by two rods 514 which extend transversely across the machine and have their ends fixed to the side plates 27 and 28.

As may be seen from the drawing, the print bars carry at their upper ends a plurality of type slugs 561 which are movable transversely of the bars. Forward of the bars, and pivoted about a shaft 606 are the hammers 605, shown herein only fragmentarily, which upon striking the slugs cause the latter to leave an impression upon a recording medium interposed between the slugs and platen 1057.

Hereinafter, the description will concern itself with only a single print set comprising a print bar, actuator rack, hammer and related elements; it being understood that the description is equally applicable to the additional eleven print sets, each of which is substantially identical to the one described.

At its lower end, the bar 562 has a series of rack teeth 18 which engage gear 566 which is also in mesh with teeth 19 formed on the lower surface of a plate 523. The plate is mounted on actuator rack 511 by means of a pair of elongated slots (not shown) on the plate, and mating studs (not shown) on the rack, in order to permit a limited amount of relative movement therebetween. The plate carries a stud 524 on which is pivotally mounted a coupling pawl 525 having in its rear end portion a cam slot 526 in which engages a stud 527 fixed to the actuator rack 511. Forwardly of cam slot 526, the coupling pawl has a slot 528 having a forwardly open horizontal portion connecting rearwardly with a vertical portion behind a shoulder 529 on the pawl 525. A tension spring (not shown) is normally so connected between the actuator rack 511 and its plate 523 as to hold the plate at the rearward limit of its possible relative movement with respect to the rack. In this position, the stud 527 of the actuator rack is in the upper forward portion of the cam slot 526 at the rear of pawl 525, compelling the pawl to assume a lowered position with respect to the actuator rack.

While the parts are in the above described normal position with the machine at rest, an actuator bail rod 531 extending transversely across the machine is engaged in the vertical portion of the slot 528 in the pawl 525, and between the rearwardly facing shoulder 529 of the pawl and a small concavity in the forward face of a shoulder 532 on the upper side of the actuator rack. The rack 511 is urged forwardly by a tension spring (not shown) which tends to hold shoulder 532 of the rack in engagement with bail rod 531.

The bail rod is guided in horizontal slots 534 (see Fig. 9) in guide plates 535 which at their rear ends are supported on a rod 536 having reduced threaded ends passing through the side plates 27 and 28 and secured therein by nuts. The forward ends of the guide plates 535 have elongated openings through which are passed a rod 538 secured in the side plates 27 and 28 similarly to the rod 536.

A signal generator slide 154 is forwardly and rearwardly slidably supported by the rearmost of the previously mentioned rods 514 and by a bearing 156 mounted in cantilever fashion on the left side plate 28 of the machine (see Fig. 9). The extreme left end of the bail 531 is supported in a boss 153 which is fixedly attached to the signal generator slide 154 by means of screws 155 so that the slide 154 will move forwardly and rearwardly with the actuator bail. A shoe 157, the purpose of which will be explained more fully hereinafter, is riveted to the slide 154.

When the bail rod is drawn forwardly by means not herein disclosed, but fully discussed in the above identified patent to Butler, the actuator rack moves therewith because of the action of the above mentioned tension spring until said rack is positively stopped by means hereinafter described. After the rack 511 has been stopped, the bail rod 531 acts against the shoulder 529 on the pawl 525 and moves the latter, and thus also plate 523 which is rotatably connected to the pawl by stud 524, further forwardly relative to the arrested rack 511. It may be recalled that the plate is slidably mounted on the rack by means of elongated slots and studs. The tension spring which normally holds the plate in its extreme rearward position with respect to the rack yields during the above mentioned relative movement.

During the forward movement of the plate relative to the arrested actuator rack 511, the stud 527 on the rack shifts into the rearward lower portion of the cam slot 526 in the pawl 525, thus raising the rearward end of the pawl and moving the shoulder 529 substantially above the center of the bail rod. By this raising of the rearward end of the pawl 525, a stud 547 on the extreme rearward end thereof is elevated into one of a series of notches in comb plate 549.

During the continued forward movement of the bail toward its forward limit, the bail acts on the edge of the shoulder 529 to cam the rear end of pawl 525 still further upward to engage the stud 547 higher in its notch in plate 549, and to engage the stud 527 in the vertical rear end portion (not shown) of the cam slot 526. Accordingly, as the bail 531 moves under the shoulder 529 into the horizontal portion of the slot 528 in pawl 525, the stud 527 in the vertical portion of slot 526 positively locks the actuator to the pawl 525 and plate 523.

In each machine cycle in which the actuator rack 511 is moved forwardly, the corresponding print bar 562 is raised by means of gear 566 to position the appropriate slug of type 561 thereon at the printing line in front of the platen 1057. As was previously described, the bail 531 causes the coupling pawl 525 and connected rack plate 523 to move forward a predetermined short distance after the associated actuator rack 511 has been arrested. Consequently, the print bar 562 will be elevated a predetermined short distance in addition to a distance proportional to the amount of movement, if any, permitted the corresponding actuator rack 511 during any machine cycle. This predetermined short distance which the type bar is elevated beyond the distance proportional to the amount of movement permitted the corresponding actuator rack is equal to the distance between the printing line and the uppermost type position on each print bar 562 when the latter is in its normal retracted position. Due to the provision of this incremental retraction of the print bars below the print line, the line is clearly visible before and after each machine cycle. In any machine cycle in which the actuator rack 511 is not permitted any forward movement, the associated print bar will be elevated to bring the uppermost type position thereon to the printing line. The types are spaced vertically on the print bar at distances corresponding to the additional lifting of the print bar resulting from each step of forward movement of the associated actuator rack under the control of the "read-in" unit as will be fully described hereinafter.

At a point in the machine cycle subsequent to the termination of forward movement of all the actuator racks and the upward movement of their associated print bars, the hammers 605 are caused, in a manner fully described in the above identified patent to Butler, to rotate in a clockwise manner about shaft 606 so as to drive the selectively aligned slugs of type 561 rearwardly into the recording medium interposed between them and the platen. It is in this manner that the desired numerals or symbols are impressed upon the recording medium.

After the printing operation takes place, the actuator bail 531 is restored to its normal rearward position by means fully disclosed in the Butler patent. After the bail re-enters the slot 528 in pawl 525, and as it reaches a position under and slightly rearward of the shoulder 529 of said pawl, the actuator bail encounters an upwardly and rearwardly inclined cam edge, and cams the rear end of the pawl 525 downwardly to disengage the vertical portion of the cam slot 526 from the stud 527 on the actuator rack 511 and lowers the stud 547 from its notch in plate 549.

During the continued rearward movement of the actuator bail 531, the inclined portion of the slot 526 moves with respect to stud 527 so as to cause the rear end of pawl 525 to move downwardly and complete the disengagement of the stud 547 from its notch in plate 549. Concurrently, the pawl re-engages the actuator bail as the latter moves into the upper vertical portion of slot 528 rearward of shoulder 529. The pawl 525, plate 523 and the actuator rack 511 are thus unlocked so that they may be positively restored to their normal positions by the actuator bail rod 531.

The "read-in" unit 32, which under the control of an external computer or calculator will selectively stop the forward motion of the actuator racks in a predetermined manner, extends transversely across the machine below the racks 511 and immediately to the rear of the print bars 562. As is best seen in Figs. 3, 3a and 4, the "read-in" comprises a series of twelve parallelly aligned clappers 33 and a signal generator 34 which are assembled in a frame having four transverse rods 35, four stiffener plates 36, an additional stiffener plate 36′, and two end plates 37 and 38. The above mentioned plates 36, 36′, 37 and 38 are perforated proximate to their corners, and the rods 35 passed therethrough as is clearly illustrated in Figs. 6, 7 and 8. Nuts 39 are screwed onto the outer extremities of the rods 35 so as to fixedly retain the assemblage. It should be noted that for purposes of clarity the rods 35 and their associated nuts 39 have been omitted from Fig. 4.

The clapper-solenoid, best illustrated in Figs. 6 and 11, comprises a core member 40 having an elongated vertical portion 43 about which is wound a coil of conductive wire 41 between two end plates 42. A forwardly extending portion of the core member contains a transverse perforation 44 near its upper end and has a concavity 45 in the lower portion of its forward surface.

The clapper 33 comprises a rearwardly protruding tongue 46 and a forwardly extending yoke 47—48, the arm 48 of which is elongated for a purpose to be hereinafter explained. Each of the arms 47—48 is formed with a perforation 49 therein whose diameter is greater than that of perforation 44 of the core member 40. The tongue 46 has an upturned rearward end 50, and contains, immediately forward of the upturned end, an insert 51 which may be of stainless steel or any other suitable material having low magnetic retentivity. A cross-bar 52 connects the yoke to the tongue.

The reset member 53 comprises a yoke 54—55 having therein perforations 56 of substantially the same diameter as those in clapper 33. Arm 55 of the reset member is of an elongated configuration and contains a relatively small perforation 57 at its lower extremity. A cross-bar 58 connects the arms 54—55 of the yoke.

In assembling the clapper-solenoid mechanisms, of which there are twelve, a shaft 59, best seen in Fig. 6, is passed through a perforation in the core members, the perforation being located immediately below the elongated portion 43. Spacer bushings 60, concentric with shaft 59 and best seen in Figs. 3 and 6, are interposed between the core members to prevent lateral movement. The shafts are also passed through registering holes in the plates 36, 36′ and 37. Nuts 61 are screwed on to the extremities of shaft 59, outboard of plates 36′ and 37 respectively. The clappers are then lowered over the core members and the arms 54 and 55 of the reset member 53 are interposed between the arms 47 and 48 of the clapper 33 and the forwardly extending portion of the core members 40. The elements are then adjusted so as to place perforations 44, 49 and 56 of the core members, clappers and reset members respectively in registration with one another. When the parts are so arranged, the inserts 51 in the tongues 46 of clappers 33 are directly above the elongated portions 43 of their associated core members 40.

Spacer bushings 62, the outer diameters of which are larger than the diameter of perforations 44, but smaller than the diameters of perforations 49 and 56 have integral collars 63 whose outer diameters are larger than those of perforations 49 and 56. These bushings are passed, one from each side, through the perforations 49 and 56 until their ends abut the side faces of the core members 40. The dimensions of the bushings are such that the side faces of the collar 63 will abut the outer faces of arms 47 and 48 when the ends of the bushings contact the sides of the core members. It should be noted that the dimensions of the elements are such that while the right end of one bushing is inserted through the perforations in arms 47 and 54 of the clapper and reset member respectively, the left end of the same bushing is passed through the perforations in arms 48 and 55 of the clapper and reset member of the adjacent clapper-solenoid assembly. The collars 63 space the assemblies the desired distance apart.

A shaft 64 is then passed through the bushings, perforations 44 of the core members, said perforations having substantially the same diameter as the axial bores in the bushings, and through registering holes in the stiffener plates 36 and 36′. Nuts 65 are screwed on to the extremities of shaft 64.

A tension spring 66, having one of its ends anchored in the perforation 57 at the lower extremity of arm 55 of the reset member 53 and its opposite end about a pin 67 attached to the lower extremity of the core member 40 and extending laterally to the right thereof, tends to urge the reset member in a counterclockwise direction about shaft 64. A similar spring 68, having one of its ends anchored to a pin 69 attached to arm 55 and extending laterally to the left thereof, and its opposite end about a pin 70 attached to the lower extremity of arm 48 of the clapper 33, tends to urge the clapper and reset member toward one another so that pin 70 is normally held in contact with the rear edge 71 of arm 55.

The signal generator 34 best illustrated in Figs. 5, 9, 10 and 12 comprises an elongated member 72 of non-conductive material affixed to end plate 38 by screws 73 and 74. A leftwardly protruding ledge portion 75 of the elongated member extends through a slot 76 in the end plate and has fixedly attached to its upper surface a series of nine electrical contacts 77. A lead line 78 is electrically connected to each of the contacts 77 and extends therefrom through a series of elongated holes 79 in a shelf integral with the lower surface of ledge 75. A reinforcing rib 80 extends downwardly from the rightmost extremity of the shelf, and transversely across member 72. A raised shoulder 81 extends transversely across the extreme right hand end of member 72, and attached to the upper surface of this shoulder, by means of three screws 82 and associated nuts 83 is a resilient multiple switch member 84 which may be composed of spring steel or any other suitable material. A conductive bus bar 85 is interposed between the switch member 84 and the nuts 83, and in addition, a terminal 86 is interposed between the bus bar and the rearmost nut 83. Lead line 87 is connected to the terminal 86 and to a convenient source of power P.

The switch member 84 comprises a transverse strip 172 having integral therewith and extending laterally to the left therefrom, a series of nine resilient tongues 88 spaced apart a distance substantially equal to the pitch between the contact members 77. When the multiple switch element 84 is attached to member 72, the tongues 88 lie directly above contacts 77, and contacts 89, one of which is fixedly attached to the lower surface of each of the tongues, abut the contacts 77. To the left of contacts 89, and fixed to the upper surface of each of the tongues 88 is an insert 90 which serves as a guide for the lower portion of spring 91 the purpose of which will be disclosed hereinafter.

A series of nine C-shaped tappets 92 composed of nylon or any other suitable non-conductive material are assembled in a frame 93. The frame is substantially rectangular in shape, having an open central portion 94, inwardly turned side plates 95, and a downwardly turned cover plate 96 having a series of nine equally spaced slots 97 therein. A base plate 99 having a horizontal shelf 100 and a vertical portion 101 is adapted to be attached to the lower portion of frame 93 by passing screws 102 through the vertical portion of the base plate and into tapped holes 103 in the frame. The base plate when attached to the frame, forms, in conjunction with the cover plate 96 and side plates 95, a container for the tappets 92. Compression springs 104 are passed over the cylindrical spring guides 105 which extend downwardly from the lower surface 106 of the tappets. The guides are inserted in holes 107 in the horizontal shelf 100 causing the springs to be compressed between the shelf and the lower surface 106. The upper section of the tappets are undercut along both their left and right edges so as to provide shoulders 108 and 109, and a central guide portion 110 which is inserted in the slots 97 in the cover plate 96, the slots being so dimensioned as to be in line with the associated holes 107 in the base plate. The base plate is then fastened to frame 93 by means of the above mentioned screws 102 and the tappets 92 are permitted to rise under the urging of their associated springs 104 until the shoulders 108 and 109 abut the underside of coverplate 96. The head 111 of guide member 112 is inserted in the cross-bar portion of T-slot 113 while claws 114 integral with the face of frame 93 are inserted in their mating slots 115 in end plate 38. Simultaneously, cam pin 116 of the frame 93 is passed through the vertical slot 117 in the end plate 38. Compression springs 91 are then passed over their associated guides 118 depending from the upper jaw of the tappets 92 and also about the inserts 90 located at the outboard end of the tongues 88 of the multiple switch element 84 so that the tongues are urged downwardly by the springs. As a result contacts 89 on the lower surface of the tongues are yieldingly held in firm engagement with contacts 77.

The cam pin 116 after being passed transversely through the vertical slot 117 in side plate 38 is inserted into slot 168 in cam 119 which is fixedly mounted upon a shaft 800" which runs the entire length of the "read-in" unit. Inboard of the cam 119 and mounted on the same shaft 800" is a cam 121 with a spacer bushing 122 interposed between it and the cam 119. An additional bushing 123 is interposed between cam 121 and plate 36'. Similarly, a cam 124, substantially identical to the cam 121 is mounted on shaft 800" outboard of the right end plate 37 with a spacer bushing 125 interposed therebetween.

A reset bail 126, having a rocker mechanism 127 at each of its ends, runs transversely across the unit. As is best seen in Figs. 6 and 11 the bail 126 is located below the clappers 33 and between the core members 40 and reset member 53. The concavities 45 along the forward edges of the core members provide bearing surfaces for the bail without restricting its freedom of oscillation within a preselected range as will be hereinafter described.

The rocker mechanisms 127 as is best seen in Figs. 3 and 13 comprise bosses 128 having integral therewith plates 129 of a greater transverse dimension than their associated bosses. Cylindrical protrusions 130, coaxial with the reset bail extend out beyond the plates 129 and are journaled for rotation in bearings 131 fixed to the plates 36' and 37 respectively. Off-set from the protrusions 130, but parallel thereto, are crank arms 132 which extend through the kidney shaped perforations 134 in the plates 36' and 37 respectively, and into the slots 133 in cams 121 and 124. The arrangement is such that when the cams 121 and 124 are rocked in a clockwise direction (from the full line to the phantom position in Fig. 7) arms 132 ride along the cam slots 133, moving upward in the kidney shaped slots 134 and rocking the reset bail 126 from the phantom position to the full line position of Fig. 6. Tension springs 173 having their opposite ends attached to pins 174 on cams 121 and 124 and to pins 175 on plates 36' and 37 respectively tend to urge their associated cams fowardly toward the full line position of Fig. 7. Similarly, tension springs 135 having their opposite ends attached to pins 136 on plates 129 of the rocker mechanisms and to pins 137 on plates 36' and 37 respectively tend to urge their associated rocker mechanisms forwardly toward their full line position of Fig. 7.

After the "read-in" unit is assembled as above described, it is inserted in the machine in the position indicated in Fig. 1 and attached to the side plates 27 and 28, indicated in phantom in Figs. 3 and 4. Attachment of the "read-in" to the side plates is accomplished by passing screws 142 through holes provided therefor in the side plates, the end plates 37 and 38 and through spaced bushings 140 interposed between the side and end plates. Nuts 141 are threaded on to the screws 142 inboard of the end plates.

When the "read-in" unit is positioned in the machine as above described, the tappets 92 of the signal generator about the underside of shoe 157 of signal generator slide 154, and as is indicated in Fig. 5, the tappets are forced downwardly by the shoe against the resistance of springs 104 and 91. It may be seen that in this normal position of the assemblage, the contacts 77 and 89 are maintained in firm physical engagement with one another.

As is best seen in Fig. 4, when the "read-in" is attached to the side plates, the shaft 800" extends through a hole provided therefor in side plate 27 and has pinned to its extreme outboard end a bell crank 911" having a relatively long and substantially vertical arm 144 and a relatively short and substantially horizontal arm 145 as is indicated in Fig. 8. A stud 912" mounted in the upper end of the arm 144 of crank 911" rotatably supports the hub of a rearwardly extending latch member 913" which is formed with a jaw 146 having a notch 147 in its upper edge. A tension spring 914" connected between a forward projection of the latch member 913" and a stud 915" screwed to the forwardly projecting horizontal arm 145 of crank 911" urges the latch member 913" counterclockwise so as to normally maintain the notch 147 disengaged from stud 923" secured to a downward projection 149 of a slide 924. The slide is supported for forward and rearward movement on the studs 445, 446, and 447. The manner in which it is moved forwardly and rearwardly is fully disclosed in the above identified patent to Butler as are the specific mechanisms for accomplishing this task. The selective and automatic engagement of notch 147 with stud 923" may be accomplished by the depression of finger 921" in a manner substantially identical to that disclosed in the Butler patent relative to latches 913 and 913', and their associated fingers 921 and 921'. Alternatively, and for remote operation, the same result may be achieved in a manner which is fully disclosed in patent application Serial No. 492,266 filed by O. Banik et al. for a Remote Function Control System on March 4, 1955.

Figure 2:
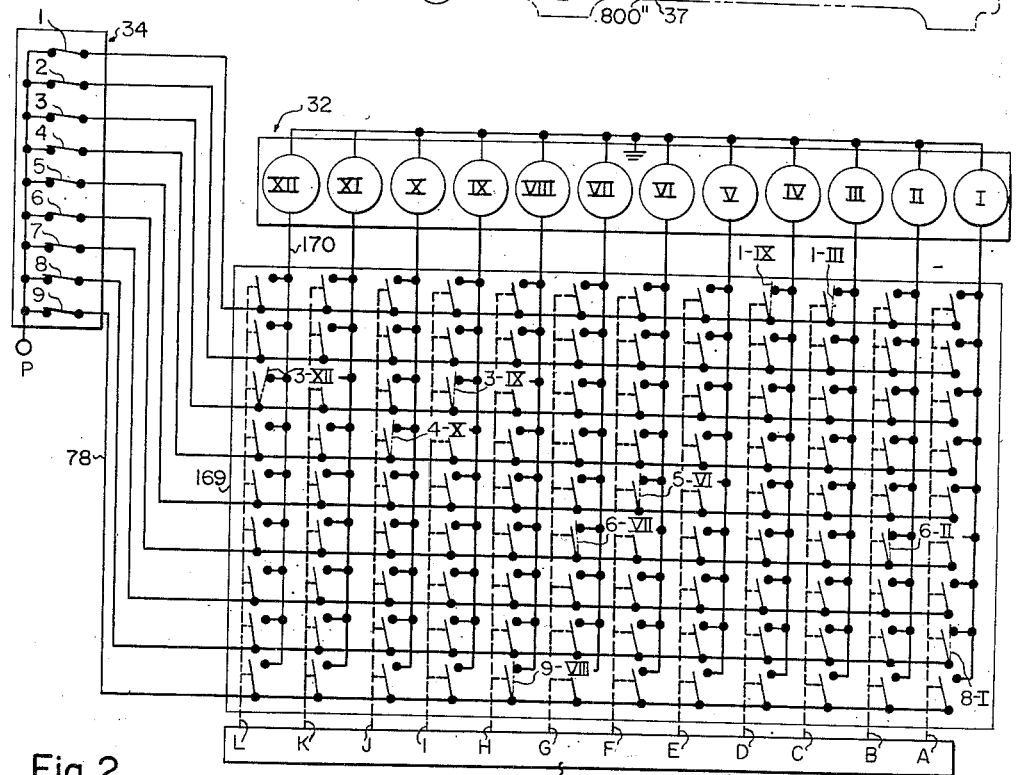
Fig. 2 is a schematic view of a computing system utilizing the instant invention and illustrating one form of switching matrix which may be employed therewith.

Referring now more particularly to Fig. 2 wherein a schematic representation of a system utilizing the instant invention is illustrated. It should be noted at this point that although one exemplary system is disclosed herein, other embodiments may be employed, with equal facility without in any way departing from the scope or spirit of the invention. The signal generator is indicated in this figure by the numeral 34 and its switches are individually designated by the numerals 1 through 9 respectively. Similarly, the clapper-solenoid assembly is broadly indicated by the reference numeral 32 and its solenoids are individually designated by the Roman numerals I through XII. Electrically interposed between the generator 34 and the assembly 32 is a schematic circuit contained within box 169 and including a plurality of switches arranged in rows and columns. Each horizontal row of switches within the box is identified by the Arabic numeral corresponding to the particular switch within the signal generator to which the row is electrically connected. Similarly, the vertical columns of switches within the box will respectively be identified by the Roman numeral corresponding to the particular solenoid to which the column is electrically connected. Accordingly, each switch within the box 169 will be identified by a compound number, partially Arabic and partially Roman, determined by the row and column in which it is located.

As may be seen from Fig. 2, the switches 1 through 9 of the signal generator 34 are connected in parallel to a source of power P by conductor 87. One side of each of the switches within each of the above mentioned rows of switches within box 169 is connected by a conductor 78 to its corresponding switch within the signal generator. The arrangement is such that all the switches within each row are in parallel with each other and in series with the associated switch within the signal generator; the latter switches in turn being connected in parallel to the power supply. Similarly, the opposite sides of the switches within the box are connected by conductors 170 into columns, with the switches in each column being in parallel with each other and in series with their associated solenoids I through XII. The solenoids are in turn connected to ground. It may therefore be seen that an individual and unique circuit exists from each of the switches in the signal generator to each of the solenoids via the above described switching matrix within box 169.

Box 176 indicates a remotely located calculator or computer which by means designated herein schematically by broken lines A through L determines which of the normally open switches within the matrix 169 shall be closed. A detailed account of how this is accomplished is set forth in patent application Serial No. 525,343 filed by R. Bradshaw et al. on March 4, 1955 for a Read Out Mechanism. An alternative means is set forth in patent application Serial No. 492,062 filed by G. G. Hoberg et al. on March 4, 1955 for an Electronic Computer System.

Assuming that after a complete cycle of operation of the calculator or computer 176 it appears that the number "304396501168" should be printed. Accordingly, the means A, B, C, D, F, G, H, I and L under the control of the machine 176 will close switches 8–I, 6–II, 1–III, 1–IV, 5–VI, 6–VII, 9–VIII, 3–IX, 4–X, and 3–XII. Accordingly, circuits are thus formed from switch 1 of the signal generator to solenoids III and IV via switches 1–III and 1–IV respectively; from switch 3 of the generator to solenoids IX and XII via switches 3–IX and 3–XII; from switch 4 to solenoid X via switch 4–X; from switch 5 to solenoid VI via switch 5–VI; from switch 6 to solenoids II and VII via switches 6–II and 6–VII; from switch 8 to solenoid I via switch 8–I; and, from switch 9 to solenoid VIII via switch 9–VIII. No circuits exist from switches 2 and 7 of the signal generator because these digits do not appear in the desired number. Similarly, no circuits exist to solenoids V and XI because a zero is to appear in these digit positions, and accordingly no switches were closed in columns V and XI of the switching matrix.

The cycle of operation of the printer will henceforth be described in terms of degrees of rotation of its main cam shaft. A detailed description of the construction and mode of operation of the main cam shaft is set forth in the above identified patent to Butler. Referring now more particularly to Fig. 14 which is a graphic representation of a cycle of operation. The actuator racks 511, the signal generator slide 154 and the reset slide 924 are all in their normal rest positions when the cam shaft is at its 0° location. When the actuator racks are in their rest position, the leading edge of the foremost ratchet tooth of each rack, there being ten ratchet teeth 171 located on the lower surface of each rack, is located immediately to the rear of the tongue 46 of its associated clapper 33 as is indicated in Fig. 6. The shoe 157 of the signal generator slide 154 is located immediately above the tappets 92 when the slide is in its rest position, as is shown in Fig. 9. Similarly, the stud 923″ is positioned in vertical alignment with notch 147 of the latch member 913″ when the reset slide 924 is in its rest position as is illustrated in Fig. 8.

At this point, finger 921″ is in its upper position, permitting spring 914″ to raise and hold latch member 913″ out of engagement with stud 923″ on the depending portion 149 of slide 924. Cam 124 is held in its forwardmost position by spring 132 as is indicated in Fig. 8, and by the full line position of the cam in Fig. 7. Cam 121 at the opposite side of the "read-in" (see Fig. 4) is located in a similar position as is cam 119 of the signal generator 34. As a result crank arm 132 of the rocker mechanism 127 is held in the lowermost portion of slot 134 compelling the reset bail 126 to which it is attached to assume the position indicated in phantom in Fig. 6. Similarly, the pin 116 integral with the signal generator frame 93 and engaged in slot 168 of cam 119 is held in the lowermost portion of slot 117 in end plate 38 (see Figs. 5 and 9).

With the reset bail 126 in the position indicated in phantom in Fig. 6, the reset member 53 will be held in its forwardmost position against the resistance of spring 66. Spring 68, connected between the reset member and clapper 33 holds the latter down so that its insert 51 is in physical contact with the elongated portion 43 of the core member 40. Similarly with pin 116 at the bottom of slot 117, frame 93 is held in its lowermost position so that its cover plate impinges upon the shoulders 108 and 109 of the tappets 92, forcing the latter downward against the resistance of springs 104, below and out of contact with the lower surface of shoe 157 of the signal generator slide 154.

As may be seen from Fig. 14, the actuator racks 511, signal generator slide 154 and the reset slide 924 remain in their normal rest position from the 0° point described above until the 38° point. During this period finger 921″ is moved downwardly in a manner fully described in the Butler patent so as to place latch 913″ in engagement with the reset slide 924, and the current is applied to the solenoids. When energized the solenoids have sufficient strength to hold the clappers down against the resistance of springs 66 if the clappers are in physical contact with the cores. However, the solenoids are of insufficient strength to draw the clappers downward if an air space exists between the clappers and the cores. The path of the current is from P, across the now closed switches 1 through 9 of the signal generator to the closed switches 8–I, 6–II, 1–III, 1–IV, 5–VI, 6–VII, 9–VIII, 3–IX, 4–X and 3–XII of the switching matrix, and from the matrix to solenoids I through IV, VI, through X, and XII. From the solenoids the current goes to ground and back to P. As no switches were closed in columns V and XI of the matrix, their associated solenoids V and XI remain de-energized.

From the 38° point to the 88° point slide 924 moves rearwardly, carrying latch 913″ therewith and therefore causing bell crank 911″ to rotate in a clockwise direction. Such rotation is transmitted by shaft 800″ from the bell crank to cams 124, 121 and 119, compelling the cams to assume their rearmost position, indicated in phantom in Fig. 7 with respect to cam 124. With the cams 121 and 124 in this position, crank arm 132 of the rocker mechanism is moved to the uppermost portion of slot 134 so as to rotate the reset bail 126 to the full line position of Fig. 6. However, since the current has already been applied to solenoids I through IV, VI through X and XII, their associated clappers 33 are magnetically maintained in contact with the cores of these energized solenoids. As the pins 70 of these clappers abut the edge of the arms 55 of their corresponding reset members 53, the latter are prevented from moving rearwardly, and springs 66 are maintained in their stressed condition.

Conversely, no current has been applied to solenoids V and XI and accordingly no magnetic force exists to maintain the associated clappers 33 in contact with the cores. As a result, the springs 66 cause the reset members 53 to which they are attached to rotate in a counterclockwise direction. As pin 70 of the clapper 33 lies in the path of rotation of the reset member, a similar motion is imparted to the clappers over solenoids V and XI with the result that the upturned edge of the tongues 46 of the clappers locks into the foremost ratchet tooth.

171 of the associated actuator racks, preventing any forward movement of these racks.

While crank arm 132 of the rocker mechanism is being moved to the uppermost portion of slot 134, pin 116, associated with the signal generator is moved by cam 119 into the uppermost portion of slot 117, and accordingly frame 93 is raised, guide member 112 acting in conjunction with slot 113 in the frame to keep the latter in its proper path. As the frame moves upward, the tappets 92 under the urging of their associated springs 104 rise until they abut the under surface of shoe 157 of the signal generator slide 154. During this upward movement of the tappets the springs 91 expand somewhat, but remain sufficiently stressed to positively maintain the contacts 77 and 89 in abutting relationship. Similarly, the springs 104 although somewhat expanded after the above described upward movement of the tappets are nevertheless still in a substantially compressed condition.

From the 88° point to the 97° point of rotation of the main cam shaft, the actuator racks, signal generator slide and reset slide all dwell; the reset slide continuing its dwell until the 182° point.

At the 97° point the actuator bail 531 is moved forwardly by the camshaft, and as the bail is mechanically tied to the signal generator slide 154 the latter moves forwardly therewith. In addition, and in the manner previously described, those actuator racks which are free to move forwardly also do so in conjunction with the actuator bail 531.

It should be remembered that the racks associated with solenoids V and XI are prevented from moving forwardly by the engagement of their first ratchet teeth with their corresponding clappers. During the first incremental movement of the bail 531, the slides 523 associated with the locked actuator racks 511 move forwardly a small distance with respect to their racks so as to raise the corresponding fifth and eleventh print bars 562 from their retracted rest positions to a point where their uppermost slugs of type, the ones carrying the digit "zero" are in line with the print hammers 605, all as was previously explained.

At the instant, during the forward movement of the remaining actuator racks, when the leading edge of their second ratchet teeth 171, corresponding to the digit "one" reaches a point immediately to the rear of the upturned edge of tongues 46 of the clappers 33, the shoe 157 of signal generator slide 154 passes out from over the tappet 92 of switch 1 of the generator. Accordingly, and under the urging of its spring 104 the tappet pops upward until its shoulders strike the underside of cover plate 96, as its indicated in phantom in Fig. 10. During this upward movement of the tappet its lower jaw strikes the tongue 88 of switch 1 and raises it against the resistance of spring 91, thus separating the contacts 77 and 89 and effectively opening switch 1.

With switch 1 open, the circuits to solenoids III and IV are broken and accordingly these solenoids are de-energized with the result that their corresponding clappers move upward under the urging of springs 66 and engage the ratchet teeth of the associated racks 511 which correspond to the digit "one." Because of the provision of low magnetically retentive inserts 51 in the tongues 46, there is no tendency of the clappers to "stick" to the cores of the solenoids because of residual magnetism. It is understood that as the actuator racks were moving forwardly, the print bars 562 were moving upwardly. Further movement of the bail 531 results in an incremental upward movement of the print bars at positions III and IV and the alignment of their "one" type slugs with their associated hammers 605.

Further forward movement of the actuator bail 531 results in the passage of shoe 157 out from over the "two" tappet in the signal generator permitting the latter to move upward to the phantom position of Fig. 10 and open switch 2 as the "two" ratchet teeth of the "free" racks approach their clappers. However, as the digit "two" does not appear in the number "304396501168" which is to be printed, none of the circuits to the solenoids include switch 2 of the signal generator, and accordingly the opening of this switch does not affect any of the solenoids or their associated actuator racks 511.

As the actuator bail 531, signal generator slide 154 and actuator racks 511 continue to move forwardly, the third tappet pops upward opening switch 3 of the signal generator which results almost instantaneously in the de-energization of solenoids IX and XII through the circuits including switches 3-IX and 3-XII respectively, and the actuator racks 511 in the IX and XII positions are locked at the point in their forward travel corresponding to the digit "three." After a further incremental movement of the actuator bail 531, the print bars 562 in the IX and XII positions are raised sufficiently to align their respective "three" types 561 with their associated hammers 605.

In like manner when the shoe 157 passes over the "four" tappet, the rack 511 in position X will be locked, followed by the alignment of type slug "four" with its hammer in the X position. Similarly, opening of the "five" generator switch results in the alignment of the "five" slug at positions II and VII. The opening of the "seven" switch has no effect, as the digit "seven" does not appear in the desired number "304396501168." The subsequent opening of the "eight" switch causes the alignment of slug "eight" in the I position followed by the alignment of the "nine" slug in the VIII position when switch "nine" is opened.

When the 152° point is reached, all of the actuator racks 511 have been locked in their desired positions. The actuator bail 531 and slide 154 continue to move forwardly until the 174° position is reached. At this point all the tappets 92 are in their uppermost position and each of the desired slugs of type necessary for the printing of the numeral "304396501168" is aligned with its associated hammer. At this point the power supply to the signal generator is turned off.

From the 174° point until the 182° point, the actuator bail 531, signal generator slide 154, actuator racks 511 and reset slide 924 are all at rest. During this interval the hammers 605 rotate in a counterclockwise direction and sharply strike the associated type slugs 561 which are in the path of their movement so as to drive the slugs into a recording medium interposed between the slugs and platen 1057, resulting in the impression on the medium of the digits or symbols carried by the slugs; in this case, the numeral "304396501168."

At the 182° point, and as is clearly indicated in Fig. 14, the reset slide commences to move forwardly and continues to do so until the 215° point when it reaches its normal rest position. This results in the counterclockwise movement of bell crank 911" back toward the position of Fig. 8 since latch 913" is engaged with stud 924. A similar motion is imparted to cams 124 and 121 via shaft 800" so as to return these cams, with the aid of spring 173, from the phantom position of Fig. 7 to the full line position of that figure. A like movement is imparted to cam 119 of the signal generator 34.

As the cams 121 and 124 move back toward their normal rest position, the crank arm 132 of the rocker mechanism 127 is moved by the slots 133 in the cams 121 and 124 from the uppermost position in slot 134, indicated in phantom in Fig. 7, to the lowermost or full line position in Fig. 7 in slot 134. Such movement of the arm and rocker mechanism results, with the aid of spring 135, in the rotation of the reset bail 126 from the full line to the phantom position in Fig. 6. As the bail moves in this clockwise manner, it contacts the elongated arms 55 of the twelve reset members 53 and compels the latter to rotate against the resistance of their associated springs 66 to the position shown in Fig. 6. Because of the stressed condition of springs 68, connected between the reset members and their associated clappers, the latter are compelled to rotate with the reset members until the low magnetically retentive inserts 51 in their tongues 46 impinge upon the elongated portions 43 of their associated cores 40. Until the commencement of the next cycle, the clapper-solenoid assemblies are mechanically held in this lowered position against the resistance of springs 66 by the reset bail 126 aided by the springs 178 and 135. The actuator racks 511 are thus freed of engagement from their associated clappers.

Substantially simultaneously with the above described readjustment of the clappers, the cam 119 moves pin 116 of the signal generator frame 93 from the uppermost to the lowermost portion of slot 117 in end plate 38. Such movement of the pin causes the lowering of the frame whose cover plate 96 engages the shoulders 108 and 109 of the various tappets 92 compelling the latter to move downward against the resistance of their associated springs 104 until their guide portions 110 are well below the plane of the undersurface of shoe 157 of the signal generator slide 154. As the tappets are being moved downwardly by the frame, their lower jaws move away from the tongues 88 of the multiple switch element 84, enabling the latter to be moved downwardly by springs 91 until the contacts 89 strike the contacts 77, thus closing switches 1 through 9.

The reset slide 924 dwells in its normal rest position from the 215° point until the commencement of the next cycle of operation. However, at the 194° point the actuator bail 531 and signal generator slide 154 commence to move rearwardly toward their normal rest positions. At the 215° point the actuator bail 531 moves into the upper vertical portion of slots 528 in pawls 525 (see Fig. 1) of the racks 511 which were stopped in the "9" position, thus unlocking the pawls, plates 523 and their actuator racks 511 as was previously explained, enabling the racks to be positively restored to their normal positions. As the bail continues back toward its rest position, it will sequentially "pick up" the racks which were locked in the "8," "7," "6," "5," "4," "3," "2," "1" and "zero" positions.

Rearward movement of the actuator bail 531, signal generator slide 154 and actuator racks 511 continue until the 271° point at which time these elements are in their normal rest position; the leading edge of the foremost or "zero" ratchet teeth 171 of the racks are immediately to the rear of the upturned edges of tongues 46 of the clappers 33 and the shoe 157 of the signal generator slide 154 is directly over the tappets 92 which have been lowered and held below and out of contact with the underside of the shoe.

All of the above described elements dwell from the 271° point until the 360° point as is indicated by Fig. 14. The main cam shaft has now been returned to its 0° position and the system is ready for another cycle of operation as described above.

It may therefore be seen that through the utilization of the instant invention a system can be provided in which it is possible to separate the printing from the calculating or computing portion of the system and locate each portion at that position where it may be utilized most efficiently. Further, because of the unique signal generator employed to determine when the various slugs of type are at the desired location, and the utilization of this generator in conjunction with a switching matrix or its electronic equivalent to hold the antecedently determined slugs at a desired location, it is possible to utilize a mechanical printer in conjunction with an electronic computer. In addition and by "splitting" the matrix, it is feasible to employ one printer with two or more computers or vice-versa. It should also be noted that the instant invention incorporates means for automatically printing a "zero" when no signal is received from the remotely located computer, the circuitry and power requirements are therefore cut to a minimum while the speed of operation is increased proportionately. In addition and because of the novel arrangement of the components within the system only one signal generator having only nine switches is required regardless of the number of columns of digits to be printed. In the instant disclosure twelve columns of digits were used, but it should be obvious that twenty or thirty or one hundred columns could have been employed if desired and still only one signal generator would be needed.

Having thus disclosed an exemplary embodiment thereof, what we claim as our invention is:

1. A system of the class described comprising, an elongated member having a plurality of ratchet teeth thereon, means to yieldingly drive said member in one direction and subsequently positively return said member, a clapper urged into engagement with the above mentioned ratchet teeth by an associated spring, a solenoid, means to energize said solenoid, said solenoid when energized being operable to resist the spring and retain the clapper out of engagement with the ratchet teeth when the clapper is in physical contact with said solenoid, however, said solenoid even when energized being of insufficient strength to withdraw the clapper from engagement with the ratchet teeth against the resistance of the spring, means for selectively determining which of the ratchet teeth is to be engaged by the clapper, additional means operable while the elongated member is being yieldingly driven to determine when the selected ratchet tooth is in a position to be engaged by the clapper, said solenoid being automatically de-energized when said determination is made, thus enabling the clapper to move under the urging of its spring to engage the selected ratchet tooth and arrest the elongated member, and reset means to positively move the clapper out of engagement with the ratchet tooth and back into contact with the solenoid prior to the positive return of the elongated member to its initial position.

2. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means to energize said solenoid, said solenoids when energized being operable to resist the springs and retain their related clappers out of engagement with the ratchet teeth when the clappers are in physical contact with the solenoids, however said solenoids even when energized being of insufficient strength to withdraw their related clappers from engagement with the ratchet teeth against the resistance of the springs, means for selectively determining which of the ratchet teeth on the individual elongated members is to be engaged by its associated clapper, additional means operable while the elongated members are being yieldingly driven to determine when the selected ratchet tooth on each of said members is in a position to be engaged by its associated clapper, the solenoids related to said clappers being automatically and selectively de-energized when it is determined that the selected ratchet tooth on each of said elongated members is in a position to be engaged by its associated clapper, thus enabling the clappers to move under the urging of their springs to engage the selected ratchet teeth and arrest the elongated members in preselected positions, and reset means to positively move the clappers out of engagement with the ratchet teeth and back into contact with their related solenoids prior to the positive return of the elongated members to their initial positions.

3. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means to energize said solenoid, said solenoids when energized being operable to resist the springs and retain their related clappers out of engagement with the ratchet teeth on the associated elongated members, means for selectively determining which of the ratchet teeth on the individual elongated members is to be engaged by its associated clapper, choice of the first tooth on any of the elongated members resulting in the immediate de-energization of the corresponding solenoids and the engagement of the applicable clapper with the selected tooth, and additional means operable while the elongated members are being yieldingly driven to determine when the selected ratchet tooth subsequent to the first on each of said members is in a position to be engaged by its associated clapper, the solenoids related to said clappers being automatically and selectively de-energized when it is determined that the selected ratchet tooth on each of said elongated members is in a position to be engaged by its associated clapper, thus enabling the clappers to move under the urging of their springs to engage the selected ratchet teeth and arrest the elongated members in preselected positions.

4. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means to energize each solenoid, said solenoids when energized being operable to resist the springs and retain their related clappers out of engagement with the ratchet teeth on the associated elongated members, means for selectively determining which of the ratchet teeth on the individual elongated members is to be engaged by its associated clapper, additional means having a plurality of switches which are yieldingly urged open, each of said switches corresponding to and being associated with a particular ratchet tooth position on the elongated members, and means holding said switches closed, said last named means being operable while the elongated members are being yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids so as to enable the corresponding clappers to move under the urging of their springs to engage the selected ratchet teeth and arrest the elongated members in preselected positions.

5. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means for energizing each solenoid, said solenoids when energized being operable to resist the springs and retain their related clappers out of engagement with the ratchet teeth on the associated elongated members, means for selectively determining which of the ratchet teeth on the individual elongated members is to be engaged by its associated clapper, choice of the first tooth on any of the elongated members resulting in the immediate de-energization of the corresponding solenoids and the engagement of the applicable clapper with the selected tooth, additional means having a plurality of switches which are yieldingly urged open, each of said switches corresponding to and being associated with a particular ratchet tooth position other than the first on the elongated members, and means holding said switches closed, said last named means being operable while the elongated members are being yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids so as to enable the corresponding clappers to move under the urging of their springs to engage the selected ratchet teeth and arrest the elongated members in preselected positions.

6. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means for energizing each solenoid, said solenoids when energized being operable to resist the springs and retain their related clappers out of engagement with the ratchet teeth when clappers are in physical contact with the solenoids, however said solenoids even when energized being of insufficient strength to withdraw their related clappers from engagement with the ratchet teeth against the resistance of the springs, means for selectively determining which of the ratchet teeth on the individual elongated members is to be engaged by its associated clapper, additional means having a plurality of switches which are yieldingly urged open, each of said switches corresponding to and being associated with a particular ratchet tooth position on the elongated members, means holding said switches closed, said last named means being operable while the elongated members are yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids so as to enable the corresponding clappers to move under the urging of their springs to engage the selected ratchet teeth and arrest the elongated members in preselected positions, and reset means to positively move the clappers out of engagement with the ratchet teeth and back into contact with their related solenoids prior to the positive return of the elongated members to their initial position.

7. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means for energizing each solenoid, said solenoids when energized being operable to resist the springs and retain their related clappers out of engagement with the ratchet teeth when the clappers are in physical contact with the solenoids, however said solenoids even when energized being of insufficient strength to withdraw their related clappers from engagement with the ratchet teeth against the resistance of the springs, means for selectively determining which of the ratchet teeth on the individual elongated members is to be engaged by its associated clapper, choice of the first tooth on any of the elongated members resulting in the immediate de-energization of the corresponding solenoids and the engagement of the applicable clapper with the selected tooth, additional means having a plurality of switches which are yieldingly urged open, each of said switches corresponding to and being associated with a particular ratchet tooth position other than the first on the elongated members, means holding said switches closed, said last named means being operable while the elongated members are yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids so as to enable the corresponding clappers to move under the urging of their springs to engage the selected ratchet teeth and arrest the elongated members in preselected positions, and reset means to positively move the clappers out of engagement with the ratchet teeth and back into contact with their related solenoids prior to the positive return of the elongated members to their initial position.

8. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means for energizing each solenoid said solenoids when energized being operable to resist the springs and retain their related clappers out of engagement with the ratchet teeth on the associated elongated members, an insert in each of said clappers aligned with the related solenoid, said inserts having the property of low magnetic retentivity, means for selectively determining which of the ratchet teeth on the individual elongated members is to be engaged by its associated clapper, additional means having a plurality of switches which are yieldingly urged open, each of said switches corresponding to and being associated with a particular ratchet tooth position on the elongated members, and means holding said switches closed, said last named means being operable while the elongated members are being yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids, upon the de-energization of the solenoids the corresponding clappers because of the magnetic property of their inserts immediately and without any tendency to stick to the solenoids move under the urging of their springs to engage the selected ratchet teeth and arrest the elongated members in preselected positions.

9. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means to energize said solenoid, said solenoids when energized being operable to resist the springs and retain their related clappers out of engagement with the ratchet teeth on the associated elongated members, an insert in each of said clappers aligned with the related solenoid, said inserts having the property of low magnetic retentivity, means for selectively determining which of the ratchet teeth on the individual elongated members is to be engaged by its associated clapper, choice of the first tooth on any of the elongated members resulting in the immediate de-energization of the corresponding solenoids and the engagement of the applicable clapper with the selected tooth, additional means having a plurality of switches which are yieldingly urged open, each of said switches corresponding to and being associated with a particular ratchet tooth position other than the first on the elongated members, and means holding said switches closed, said last named means being operable while the elongated members are being yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids, upon the de-energization of the solenoids the corresponding clappers because of the magnetic property of their inserts immediately and without any tendency to stick to the solenoids move under the urging of their springs to engage the selected ratchet teeth and arrest the elongated members in preselected position.

10. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means to energize said solenoid said solenoids when energized being operable to resist the springs and retain their related clappers out of engagement with the ratchet teeth when the clappers are in physical contact with the solenoids, however, said solenoids even when energized being of insufficient strength to withdraw their related clappers from engagement with the ratchet teeth against the resistance of the springs, an insert in each of said clappers aligned with the related solenoid, said inserts having the property of low magnetic retentivity, means for selectively determining which of the ratchet teeth on the individual elongated members is to be engaged by its associated clapper, additional means having a plurality of switches which are yieldingly urged open, each of said switches corresponding to and being associated with a particular ratchet tooth position on the elongated members, means holding said switches closed, said last named means being operable while the elongated members are yieldingly driven to permit the sequential opening of said switches as their corresponding ratchet teeth reach a position to be engaged by their associated clappers, the opening of a switch corresponding to the tooth position in which one or more of the ratchet teeth have been selected for engagement resulting in the automatic de-energization of the applicable solenoids, upon the de-energization of the solenoids the corresponding clappers because of the magnetic property of their inserts immediately and without any tendency to stick to the solenoids move under the urging of their springs to engage the selected ratchet teeth and arrest the elongated members in preselected positions, and reset means to positively move the clappers out of engagement with the ratchet teeth and back into contact with their related solenoids prior to the positive return of the elongated members to their initial position.

11. A system of the class described comprising, a plurality of elongated members each having a number of ratchet teeth thereon, means to yieldingly drive said members in one direction independently of one another and subsequently positively return said members, a clapper having a spring associated with each of said elongated members, each of said clappers being urged by its spring into engagement with the ratchet teeth on its associated elongated member, a solenoid for each clapper, means for energizing each solenoid, said solenoids when energized being operable to resist the springs and retain their related clappers out of engagement with the ratchet teeth when the clappers are in physical contact with the solenoids, however said solenoids even when energized being of insufficient strength to withdraw their related clappers from engagement with the ratchet teeth against the resistance of the springs, an insert in each of said clappers aligned with the related solenoid, said inserts having the property of low magnetic retentivity, means for selectively determining which of the ratchet teeth on the individual elongated members is to be engaged by its associated clapper, choice of the first tooth on any of the elongated members resulting in the immediate de-energization of the corresponding solenoids and the engagement of the applicable clapper with the selected tooth, additional means having a plurality of switches which are yieldingly urged open, each of said switches corresponding to and being associated with a particular ratchet tooth position other than the first on the elongated members, means holding said switches closed, said last named means being operable while the elongated members are yieldingly driven to permit the sequential opening of said switches as their corresponding ratchet teeth reach a position to be engaged by their associated clapper, the opening of a switch corresponding to the tooth position in which one or more of the ratchet teeth have been selected for engagement resulting in the automatic de-energization of the applicable solenoids, upon the de-energization of the solenoids the corresponding clappers because of the magnetic property of their inserts immediately and without any tendency to stick to the solenoids move under the urging of their springs to engage the selected ratchet teeth and arrest the elongated members in preselected positions, and reset means to positively move the clappers out of engagement with the ratchet teeth and back into contact with their related solenoids prior to the positive return of the elongated members to their initial position.

12. A system of the class described comprising in combination, printing means for recording intelligence upon an associated medium, said printing means carrying a plurality of slugs of type with each slug bearing a unique symbol, actuator means for selectively positioning the printing means, said actuator having thereon a number of ratchet teeth at least equal to the number of slugs of type carried by the printing means, the unique positioning of the printing means by the actuator means determining the specific slugs of type which will be utilized in printing the desired data, means for yieldingly moving said actuator means, additional means for indicating when the desired one of the above mentioned plurality of ratchet teeth on the actuator means is at a given location, stop means including a clapper for selectively immobilizing the actuator means by having its clapper engage one of the above mentioned teeth, said stop means being connected to said additional means, the location at which the actuator means is immobilized by the stop means determining the positioning of the printing means, and means interposed between said additional means and the stop means, said interposed means determining the specific ratchet tooth to be engaged by the above mentioned clapper, the stop means being permitted to immobilize the actuator means only when said additional means indicates that the specific ratchet tooth selected by said interposed means is at a unique location.

13. A system of the class described comprising in combination, printing means for recording intelligence upon an associated medium, said printing means carrying a plurality of slugs of type with each slug bearing a unique symbol, actuator means for selectively positioning the printing means, said actuator having thereon a number of points at least equal to the number of slugs of type carried by the printing means, the unique positioning of the printing means by the actuator means determining the specific slugs of type which will be utilized in printing the desired data, a reciprocatable member, means to reciprocably move said member, a spring urging the actuator means toward the reciprocatable member so that the actuator means tends to move therewith, additional means for indicating when the desired one of the above mentioned points on the actuator means is at a given location, stop means for selectively immobilizing the actuator means, said stop means being connected to said additional means, the location at which the actuator means is immobilized by the stop means determining the positioning of the printing means, and means interposed between said additional means and the stop means, said interposed means determining the point at which the actuator means is to be immobilized, the stop means being permitted to immobilize the actuator means only when said additional means indicates that said actuator means is at the unique location selected by said interposed means.

14. A system of the class described comprising in combination, printing means for recording intelligence upon an associated medium, said printing means carrying a plurality of slugs of type with each slug bearing a unique symbol, actuator means for selectively positioning the printing means, said actuator means having thereon a number of ratchet teeth at least equal to the number of slugs of type carried by the printing means, the unique positioning of the printing means by the actuator means determining the specific slugs of type which will be utilized in printing the desired data, a reciprocatable member, means to reciprocally move said member, a spring urging the actuator means toward the reciprocatable member so that the actuator means tends to move therewith, additional means for indicating when the desired one of the above mentioned ratchet teeth on said actuator means is at a given location, stop means including a clapper for selectively immobilizing the actuator means by having its clapper engage one of the above mentioned teeth, said stop means being connected to said additional means, the location at which the actuator means is immobilized by the stop means determining the positioning of the printing means, and means interposed between said additional means and the stop means, said interposed means determining the specific ratchet tooth to be engaged by the above mentioned clapper, the stop means being permitted to immobilize the actuator only when said additional means indicates that the specific ratchet tooth selected by the interposed means is at a unique location.

15. A system of the class described comprising in combination, printing means for recording intelligence upon an associated medium, said printing means carrying a plurality of slugs of type with each slug bearing a unique symbol, actuator means for selectively positioning the printing means, said actuator means having thereon a number of ratchet teeth at least equal to the number of slugs of type carried by the printing means, the unique positioning of the printing means by the actuator means determining the specific slug of type which will be utilized in printing the desired data, means for yieldingly moving said actuator means, additional means for indicating when the desired one of the above mentioned plurality of ratchet teeth on said actuator means is at a given location, stop means including a clapper for selectively immobilizing the actuator means by having its clapper engage one of the above mentioned teeth, a solenoid, means to energize said solenoid, said solenoid when energized tending to attract the clapper thereto and hold said clapper out of engagement with the ratchet teeth on the actuator means, a spring urging the clapper away from the solenoid, said stop means being connected to said additional means, the location at which the actuator means is immobilized by the stop means determining the positioning of the printing means, and means interposed between said additional means and the stop means, said interposed means determining the specific ratchet tooth to be engaged by the above mentioned clapper, the above mentioned solenoid being de-energized when said additional means indicates that the specific ratchet tooth selected by said interposed means is immediately proximate to the clapper, thus permitting the clapper to move away from the solenoid under the urging of its associated spring and engage the selected ratchet tooth so as to stop the actuator means in the desired position.

16. A system of the class described comprising in combination, a plurality of independently positionable printing means for recording intelligence upon as associated medium, the unique and independent positioning of each of said printing means determining the specific data which will be printed by said printing means, an actuator associated with each of the printing means for selectively positioning said printing means, each of said actuators being independently yieldingly movable in at least one direction, means for moving all of said actuators in said direction, a stop means associated with each actuator for selectively immobilizing said actuator independently of the other actuators, the location at which the individual actuators are immobilized determining the unique positioning of their associated printing means, additional means determining when the mobile actuators are at any one of a plurality of given positions, said additional means being connected to all of the stop means, and means interposed between said additional means and stop means, said interposed means determining which of the actuators shall be immobilized at any given location, each stop means being permitted to immobilize its associated actuator only when said additional means indicates that said actuator is at the unique location selected by said interposed means for that particular actuator.

17. A system of the class described comprising in combination, a plurality of independently positionable printing means for recording intelligence upon an associated medium, each of said printing means carrying thereon a plurality of slugs of type with each slug bearing a unique symbol, the unique and independent positioning of each of said printing means determining the specific slug of type on each of the printing means which will be utilized in printing the desired data, an actuator associated with each of the printing means for selectively positioning said printing means, each of said actuators having thereon a number of points at least equal to the number of slugs of type carried by its associated printing means, each of said actuators being independently yieldingly movable in at least one direction, means for moving all of said actuators in said direction, a stop means associated with each actuator for selectively immobilizing said actuator independently of the other actuators, the locations at which the individual actuators are immobilized determining the unique positioning of their associated printing means, additional means for determining when any given one of the above mentioned points on each of the mobile actuators is at a pre-selected position, said additional means being connected to all of the stop means, and means interposed between said additional means and stop means, said interposed means determining which of the actuators shall be immobilized when each of the various points on said actuators arrive at the above mentioned pre-selected position, each stop means being permitted to immobilize its associated actuator only when said additional means indicates that the point on the actuator selected by said interposed means is at the pre-selected location.

18. A system of the class described comprising in combination, a plurality of independently positionable printing means for recording intelligence upon an associated medium, each of said printing means carrying thereon a plurality of slugs of type with each slug bearing a unique symbol, the unique and independent positioning of each of said printing means determining the specific slug of type on each of the printing means which will be utilized in printing the desired data, an actuator associated with each of the printing means for selectively positioning said printing means, each of said actuators having thereon a plurality of ratchet teeth at least equal in number to the amount of slugs of type carried by its associated printing means, each of said actuators being independently yieldingly movable in at least one direction, means for moving all of said actuators in said direction, a stop means including a clapper associated with each actuator for selectively immobilizing said actuator independently of the other actuators, the locations at which the individual actuators are immobilized determining the unique positionig of their associated printing means, additional means for determining when any give one of the above mentioned ratchet teeth on each of the mobile actuators is immediately proximate to its associated clapper, said additional means being connected to all of the stop means, and means interposed between the additional means and stop means, said interposed means determining which of the actuators shall be immobilized when each of the various ratchet teeth on said actuators arrive at the above mentioned preselected position immediately proximate to its associated clapper, each stop means being permitted to immobilize its associated actuator by having its clapper engage the ratchet tooth selected by the interposed means only when said additional means indicates that the selected tooth on said actuator is at the preselected location.

19. A system of the class described comprising in combination, a plurality of independently positionable printing means for recording intelligence upon an associated medium, each of said printing means carrying thereon a plurality of slugs of type with each bearing a unique symbol, the unique and independent positioning of each of said printing means determining the specific slugs of type on each of the the printing means which will be utilized in printing the desired data, an actuator associated with each of the printing means for selectively positioning said printing means, each of said actuators being independently yieldingly movable in at least one direction, means for moving all of said actuators in said direction, a stop means associated with each actuators for selectively immobilizing said actuator independently of the other actuators, each of said stop means having a clapper, a solenoid, and means to energize said solenoid, said solenoid when energized tending to attract the clapper thereto and hold said clapper out of engagement with the ratchet teeth on its associated actuator, a spring associated with each clapper and urging said clapper into engagement with the ratchet teeth on its associated actuator, the location at which the individual actuators are immobilized determining the unique positioning of their associated printing means, additional means for determining when any given one of the above mentioned ratchet teeth on each of the mobile actuators is immediately proximate to its associated clapper, said additional means being connected to all of the stop means, and means interposed between said additional means and stop means, said interposed means determining which of the actuators shall be immobilized when each of the various ratchet teeth on said actuators arrives at the above mentioned preselected position immediately proximate to its associated clapper, the above mentioned solenoids being selectively de-energized when the additional means indicates that the specific ratchet teeth selected by the interposed means on the actuators associated respectively with said solenoids is immediately proximate to their related clappers, thus permitting the clappers to move away from the solenoids under the urging of their springs so as to immobilize the various actuators in their unique pre-selected positions.

References Cited in the file of this patent

UNITED STATES PATENTS

| | | |
|---|---|---|
| 1,054,582 | Marchthal | Feb. 25, 1913 |
| 1,812,161 | Mapel | June 30, 1931 |
| 1,874,700 | Gardner | Aug. 30, 1932 |
| 2,105,291 | Maul | Jan. 11, 1938 |
| 2,297,803 | Scheerer | Oct. 6, 1942 |
| 2,335,911 | Buhler | Dec. 7, 1943 |
| 2,503,865 | Christian | Apr. 11, 1950 |